Aug. 19, 1958     F. B. BERGER     2,847,855
AIRCRAFT NAVIGATION SYSTEM
Filed Feb. 17, 1954     2 Sheets-Sheet 1

INVENTOR.
FRANCE B. BERGER
BY
ATTORNEY.

Aug. 19, 1958 F. B. BERGER 2,847,855
AIRCRAFT NAVIGATION SYSTEM
Filed Feb. 17, 1954 2 Sheets-Sheet 2

INVENTOR.
FRANCE B. BERGER
BY
*H. S. Mackey*
ATTORNEY

United States Patent Office 2,847,855
Patented Aug. 19, 1958

2,847,855

AIRCRAFT NAVIGATION SYSTEM

France B. Berger, Pleasantville, N. Y., assignor to General Precision Laboratory Incorporated, a corporation of New York Application February 17, 1954, Serial No. 410,772

11 Claims. (Cl. 73—178)

This invention relates to aircraft navigation systems which are entirely contained within the aircraft and more specifically to systems for securing either intermittently or continuously any or all of the information necessary for the navigation of an aircraft between two selected points of the earth's surface along a preselected path.

This invention depends on measurements of the terrain elevation above a datum level, and employs the fact that in general no two profile maps showing the changes of terrain elevation with distance along two paths are alike, if flat regions of the earth such as water and plain areas are excluded. Such a terrain profile map along a selected route of an aircraft flight over broken ground is unique, and different from any other profile map, just as a selected human fingerprint is different from every other human fingerprint. It follows that, by use of a standard profile map for comparison, it is possible by recording the terrain profile during an aircraft flight to sense errors in distance flown and in course angle, and to correct these navigational elements so as to follow the standard profile map path exactly.

The terrain elevation directly beneath the aircraft may be ascertained by measuring the elevation of the aircraft above a datum level such as sea level, and by measuring the elevation above the terrain. These terrain elevation data can then be combined with elapsed time or with elapsed distance to form a record profile or variable density map in strip or line form.

This record map may be compared with the standard map either visually or by correlation apparatus, so that navigation error data can be secured intermittently or continuously by manual, semi-automatic or completely automatic means. This navigational error data can be combined with starting point data to secure complete navigational data including present latitude and longitude, distance traveled, speed along the ground track, drift angle, and course to destination.

The invention can be combined with other navigational means such as, for example, well-known automatic dead reckoning apparatus. Under such circumstances the invention becomes a component of such dead reckoning apparatus in the sense that the invention in effect provides periodical or continual fixes, or correlations of present position with known terrain points, by which the unavoidable error increasing with time, characteristic of all dead deckoning systems, is eliminated.

In one method of applying the present invention to the measurement of distance traveled, a standard profile map of the flight path is employed. The abscissae of this map are in terms of distance from the starting point and the ordinates indicate terrain elevation. A similar record profile map is prepared during flight except that the abscissae are to a time scale. Superposition of these maps indicates their correlation or degree of non-correlation, assuming reasonable accuracy of course angle, and by adjustment of the time scale to correlation, either manually or automatically, this scale is made equal to the distance scale, thus furnishing distance and speed data.

In another method of applying the present invention alone, without aid from other systems, the standard profile map is made as before with distance as abscissae. However, the ordinates are made to represent cross-track distance and terrain elevation is represented by some continuously varying property of the map surface such as optical transparency or opacity, or intensity of magnetization. The desired flight path is chosen along some intermediate ordinate value, starting at the known initial position. A record map is made consisting of a broad line starting at the initial position, the line varying in terms of the same mentioned property. Superposition of this record line map on the standard strip map, and inspection of their lack of correlation either visually or automatically, provides error data including distance and speed traveled and course. From these error data correction data can be secured and applied to the aircraft either manually or automatically.

In a third method of applying the present invention alone without use of other systems, let it be assumed that the present position in terms of latitude and longitude or other terms be available. A platen is continuously positioned by these data so that a stylus is maintained at the point representing present position. The platen is covered with a standard two dimensional map of the flight strip on which a surface property such as transparency represents terrain elevation. A record map is made recording in variations of transparency the variations in terrain elevation along the flight path. This record map is applied to the platen with the initial points of the standard map and the record map coinciding. Deviations in distance traveled, speed traveled and course are immediately apparent in the comparison of these maps and are measured by cross-correlation means. From the errors so ascertained correction signals are developed by which, based on the known initial position, true present position is secured. The present position is now fed back to position the platen, thus providing the initially assumed position data. These data are also available for manual or automatic navigation of the aircraft.

When the present invention is employed to supplement automatic dead reckoning devices it corrects the increasing random error of such devices as well as by the use of navigational fixes, but without the requirement for visual ground contact. In such use the dead reckoning instrument furnishes present position data in any form such as in latitude and longitude, and in shaft displacements which can be used to position a platen. Terrain elevation data are secured by the use of an absolute altimeter for securing a signal representing altitude of the aircraft above sea level, and by the use of a relative altimeter for securing another signal representing altitude above the terrain, the difference being the terrain elevation immediately below the aircraft. This form of the invention requires the use of previously-prepared information regarding terrain elevation along the flight path which may, for example, be in the form of a flight strip map on film having film density proportional to terrain elevation. During flight a similar strip map or film is prepared by use of the described data showing the actual path flown in terms of terrain elevation. The two terrain strip maps are then cross correlated and two orthogonal error signals are secured representing the latitude and longitude present position errors. These error signals are subtracted from the automatic dead reckoning latitude and longitude outputs, to secure corrected dead reckoning outputs. All of these operations can be performed automatically, or some may be performed manually, in both cases these described principles being followed.

The cooperative function of the automatic dead reckoning instrument in such an arrangement is to provide present latitude and longitude data to an accuracy sufficient to permit correlation of the two map transparencies, and also to permit continuous correlation of data as an implicit function of time when operations are performed automatically.

The principal purpose of this invention is to provide aircraft navigational data by the measurement from the aircraft of terrain elevation and by the comparison of these measurements with previously prepared standard terrain elevation data.

Another purpose of this invention is to provide aircraft distance flown data by the measurement from the aircraft of terrain elevation and by the preparation therefrom of a profile map comparing terrain elevation with elapsed time of flight. This map is compared with a standard profile map of the same course to secure distance and speed errors, from which present course position and speed are secured.

Another purpose of this invention is to prepare a flight record map having a surface property representative of terrain elevation, and by comparison with a similar standard strip map to secure, through observation of correlation errors, required corrections in speed, elapsed distance and course.

Still another purpose of this invention is to correlate a terrain elevation record map with a terrain elevation standard map at a point representing present position to determine errors in speed, distance and course. These errors are fed back as corrections for combination with starting position to secure corrected present position data.

Still another purpose of this invention is to provide apparatus for corrective position observation supplementary to automatic dead reckoning apparatus.

Still another purpose of this invention is to provide airborne self-contained apparatus for correcting present position indications by observation of terrain elevation, supplementary to dead reckoning apparatus.

Still another purpose of this invention is to provide airborne self-contained apparatus for correcting present position indications of the aircraft in flight by non-contact measurement of terrain elevations, supplementary to dead reckoning apparatus for continuously indicating present aircraft position.

Still another purpose of this invention is to provide self-contained airborne automatic dead reckoning apparatus for continuously indicating present aircraft position in flight in terms of latitude and longitude, together with self-contained automatic position observing apparatus based on measurement of terrain elevations providing corrections of the dead reckoned present position.

A further understanding of this invention may be secured from the detail description and drawings, in which.

Figure 1:
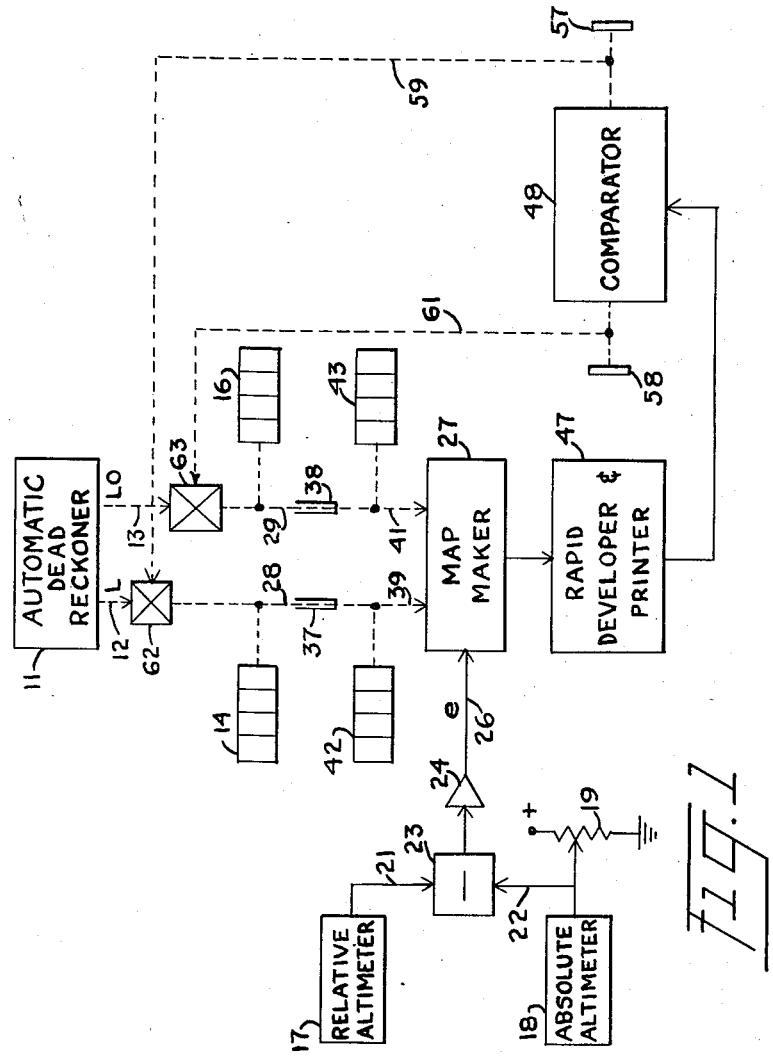
Figure 1 is a block diagram depicting an embodiment of the invention.

Referring now to Fig. 1, an automatic dead reckoning instrument 11 of any type may, for example, employ several beams of microwave energy to measure aircraft speed along its ground track and to measure drift angle. By employment of a heading reference and a computer the dead reckoning instrument computes present position from these data and indicates it as the angular displacement of output shafts 12 and 13. These angular displacements are indicated in terms of latitude and longitude on counters 14 and 16. Such an instrument is described in patent application Serial No. 749,184 filed May 20, 1947 by William J. Tull et al. and entitled, Navigation System.

Aircraft height above ground, or relative height, is indicated by a relative altimeter 17. It may be of the radar type in which a beam of microwave energy is projected directly downward from the aircraft and the time of return of the radar echo is measured, from which the relative altitude or distance above the terrain is computed. The output is in the analogue form of a direct voltage. Absolute height, or height of the aircraft above sea level, is measured by an absolute altimeter 18 which may be a barometer calibrated to read barometric pressure in terms of feet above sea level.

However, in order to avoid the necessity of frequent adjustments due to variations in barometric pressure, it is preferred to use an altimeter employing Doppler radar data. Such an instrument projects a vertical microwave beam and is arranged to abstract Doppler frequency information from the echo signal and to measure its frequency. This instrument operates on the principle that, when the aircraft is in level flight, the Doppler difference frequency is zero, even when the terrain beneath the aircraft is rising or falling, because the individual reflectors are stationary. But in diving or climbing flight the vertical velocity of the aircraft is added to or subtracted from the velocity of the transmitted beam and also of the received beam, so that when the received beam frequency is compared to the coherent transmitter microwave frequency a Doppler frequency is perceived which is proportional to the aircraft vertical velocity relative to the earth. This velocity, when integrated and added to the initial absolute altitude, yields the instantaneous absolute altitude.

The absolute altimeter output should be a direct voltage. If it is not, as in the case of the barometric altimeter having a mechanical displacement output, it may be made to operate the slider of a voltage divider either directly, as at voltage divider 19, or through a servomechanism.

The outputs 21 and 22 of the relative and absolute altimeters are subtracted in a subtracting device which may, for example, be a resistor network 23 followed by an amplifier 24. The amplifier output $e$ represents the difference in the altimeter readings and therefore represents the elevation of the terrain directly beneath the aircraft, assuming zero instrument lag.

The output $e$ of amplifier 24 is applied through conductors 26 to a map making device 27. This device is also supplied with inputs 28 and 29 representing present latitude and longitude from the automatic dead reckoning device 11.

Figure 2:
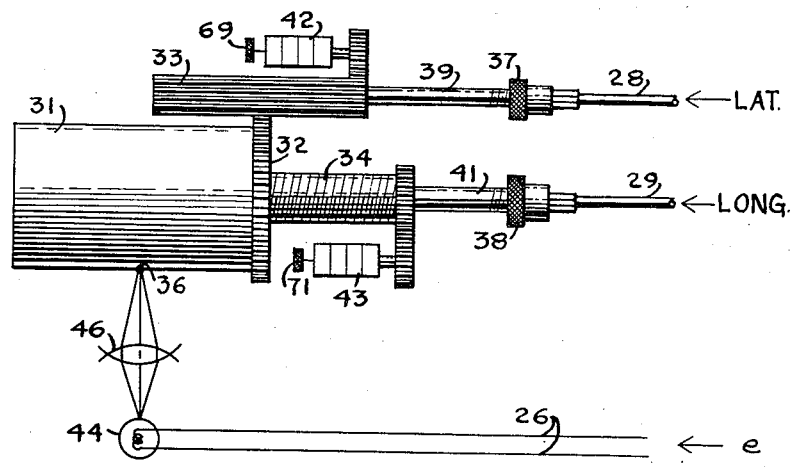
Figure 2 depicts a map making device used in connection with the invention.

The map making device is indicated schematically in Fig. 2. A cylinder 31 carries a sensitized photographic film wrapped around its periphery. The cylinder is rotated through a gear 32 and cylindrical pinion 33 by the latitude shaft 28, so that its angular position represents aircraft present latitude. The cylinder 31 is at the same time axially positioned by a screw 34 from the longitude shaft 29, so that its longitudinal position represents aircraft present longitude. A selected point, such as 36 therefore represents aircraft present position. Couplings 37 and 38 operate on the principle of the Jacobs lathe chuck and provide means for manually connecting or disconnecting input shaft 28 from shaft 39, and of shaft 29 from shaft 41. Counters 42 and 43 are geared to shafts 39 and 41 respectively. An electric lamp 44 is arranged to be energized by the output of amplifier 24, Fig. 1, through conductors 26, Figs. 1 and 2, and a lens system represented by convex lens 46 is positioned to focus light from the lamp on the sensitized film at point 36. The design is so proportioned that the resulting transmittance of the exposed, developed and printed film is a function of the quantity $e$. This design follows designs common in the sound reproduction art, the objective being the distortionless reproduction of a signal by means of a variable density film strip.

The operation of this device as described is intermittent, and at intervals the film is removed and developed in a rapid developer 47, Fig. 1. A film base print is made in which the path traced on the moving film is a broad line of varying transparency, while the remainder of the film being unexposed, is opaque. The finished print is inserted in a comparison device 48 where it is compared with a previously prepared standard, which is in the form of a flight strip map having transparency along a broad line, representing the flight path, proportional to the elevation of the terrain. The surface of the standard map outside this broad line is opaque.

Figure 3:
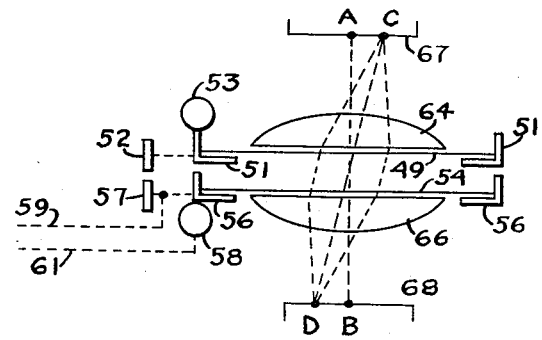
Figure 3 depicts a cross correlator used in the invention.

The comparison device 48 makes use of the cross correlation principle, and is schematically shown in Fig. 3. The standard flight strip map is in the form of a rectangle of positive film 49. This standard map is prepared to the requisite scale in accordance with the size of the map, the speed of the aircraft, and the length of time consumed in the making of each data map. The standard map 49 is placed in a frame 51 which is adjustable in two mutually perpendicular directions by the adjusting knobs 52 and 53 for the purpose of initial adjustment of the standard map. The data map is also in the form of a rectangle of positive film 54, of size similar to that of the standard map 49 or smaller. The data map is held in a frame 56 which is orthogonally adjustable by knobs 57 and 58. These knobs are for the purpose of manually effecting cross correlation of the standard and data maps, and the shafts 59 and 61 of knobs 57 and 58 are extended to apply latitude and longitude corrections through differentials 62 and 63, Fig. 1, to the dead reckoner 11 output shafts 12 and 13.

The comparison device is provided with a lens system consisting of two plano-convex lenses, 64 and 66, one on each side of the pair of film strips and close thereto. A plane light source 67 is positioned at one focal plane of the lens system and a plane image surface 68 is positioned at the conjugate focal plane.

In the operation of this device to indicate the correlation of two transparencies in the planes 49 and 54, it will be evident that if the two transparencies are identical and are accurately superimposed, then light emanating from the light plane at point A will illuminate all parts of the transparency 49, will pass in normal rays to transparency 54, then will be collected and focused at point B in plane 68. Light from any other point such as C will also illuminate all parts of transparency 49 but will then pass in parallel rays not normal to the transparency 54, and therefore these rays, meeting less correlation, will in general be less transmitted than the rays from A, so that their focused spot D will be dimmer than spot B. Thus when the transparencies are accurately superimposed the spot B is brighter than any other spot in focal plane 68. It follows that when the two transparencies are inaccurately superimposed the bright spot will be found off center. When the two transparencies are similar but not identical the best correlation, even though not perfect, is indicated by the centering of the bright spot at B. Consequently, by use of the knobs 57 and 58 to move the transparency 54, a position can be found at which the bright focal spot will be at B.

In the operation of this navigation system, the automatic dead reckoner 11, Fig. 1, continuously positions shafts 12 and 13 in accordance with latitude and longitude and thus continuously amends the reading of latitude indicator 14 and longitude indicator 16. At the start of an observation a strip of sensitized film is wrapped around cylinder 31, Fig. 2, the cylinder being suitably shielded to exclude unwanted light. The chucks 37 and 38 are loosened to break connection with shafts 28 and 29, and the cylinder 31 is positioned circumferentially and along its axis so that the focal point of the lens system 46 will be in a corner or at an edge of the film, in accordance with the direction that the course is to take, so that all of the data to be inscribed on the film during the run of, say, fifteen minutes, will be registered within the bounds of the film. The chucks 37 and 38 are then tightened so that shafts 28 and 29 drive cylinder 31, and counters 42 and 43 are set by the resetting knobs 69 and 71 to agree with counters 14 and 16, Fig. 1. The light emanated by lamp 44 draws a line on the film around cylinder 31 having a degree of exposure representing terrain elevation along the profile of the flight path. Upon the expiration of the data period the chucks or clutches 37 and 38, are loosened, stopping the motions of the cylinder 31 and stopping the counters 42 and 43. The film is then removed, developed, and printed on film to form a positive transparency.

This data transparency is inserted in the frame 56, Fig. 3. A standard transparency carrying a record of the terrain elevation profile over the path just flown is inserted in frame 51. By adjustment of knobs 52 and 53 this standard transparency is moved in both axes until the brightest spot on plane 68 is at the center B, indicating the best position of cross correlation. Under this condition the last terminal data point on the data transparency in general will not coincide with any point on the standard transparency because of drift of the dead reckoner. The readings of this point on counters 42 and 43 are noted and the corresponding point is found on the standard map, which carries a latitude-longitude grid. The knobs 57 and 58 are now employed to superimpose the last terminal data point on the data transparency with the indicated point on the standard map. In so adjusting knobs 57 and 58 their movements are transmitted through shafts 59 and 61 and the differentials 62 and 63 to the shafts 28 and 29, and to the indicating counters 14 and 16, thus correcting their indications.

As mentioned, the described position-finding system using standard terrain profiles can be made automatic and continuous by substituting automatic and continuous components for the manual and periodic map maker, developer, and comparator.

Another possibility is to employ a slant range radar altimeter having a radial fan beam to secure instantaneous data over a segment of a straight flight path still to be flown over. Comparison of such data with standard maps can be made automatic and continuous and will be particularly useful in giving warning when approaching mountains, in addition to the normal function of correction of dead reckoning position data.

What is claimed is:

1. An aircraft navigation system for indicating aircraft position comprising, means for recording the variations of terrain elevation along the flight path of said aircraft, means for comparing said recorded terrain elevation variations with known elevation data of the area of said flight path, and means for determining aircraft position from said comparison means.

2. An aircraft navigation system for indicating aircraft position comprising, a prepared map of terrain elevation and distance along the route to be navigated, means for preparing a map of terrain elevation and changes therein during flight, means for correlating said prepared map with said recorded terrain elevation, and means for securing aircraft position from said correlation.

3. An aircraft navigation system for indicating aircraft position comprising, means for continuously determining aircraft altitude above terrain, means for continuously determining aircraft altitude above sea level, means for subtracting said determinations to provide a continuous indication of terrain profile over the flight path of said aircraft, and means for determining the position of said aircraft from the unique pattern of terrain profile so obtained.

4. An aircraft navigation system for indicating aircraft position comprising, means for continuously generating a signal representative of instantaneous aircraft altitude above terrain, means for continuously generating a signal representative of instantaneous aircraft altitude above sea level, means for subtracting said signals to obtain a difference signal representative of instantaneous terrain profile along the flight path of said aircraft, means for recording said difference signal, and means for correlating said recorded difference signal with a similar standard record of terrain profile to obtain a determination of aircraft position.

5. An aircraft navigation system for indicating aircraft position comprising, means for continuously generating a signal representative of instantaneous aircraft altitude above terrain, means for continuously generating a signal representative of instantaneous aircraft altitude above sea level, means for subtracting said signals to obtain a difference signal representative of instantaneous terrain profile along the flight path of said aircraft, means for recording said difference signal as a function of varying light intensity, and means for correlating said recorded signal with a standard record of terrain profile to obtain a determination of aircraft position.

6. An aircraft navigation system for indicating aircraft position comprising, means for continuously generating a signal representative of instantaneous aircraft altitude above terrain, means for continuously generating a signal representative of instantaneous aircraft altitude above sea level, means for subtracting said signals to obtain a difference signal representative of instantaneous terrain profile along the flight path of said aircraft, means for recording said difference signal on a film strip as a function of the transparency thereof, and means for correlating said record with a similar standard record of terrain profile to obtain a determination of aircraft position.

7. A method of aircraft navigation on a predetermined flight path comprising, preparing a standard map in three dimensions for said flight path, geographical ground position being indicated by the orthogonal planar coordinates and terrain elevation being indicated by a function of map transparency, continuously positioning a platen in aircraft present position during flight, measuring terrain elevation below said aircraft during flight, plotting said measured terrain elevation in terms of a function of map transparency on said platen to form a three-dimensional record map, geographical ground position thereon being indicated by orthogonal planar coordinates, correlating said standard map with said record map to secure from flight path and cross-path errors therebetween the orthogonal components of present position error, and feeding back said present position error to correct the said positioning of the platen in present position.

8. An aircraft navigation system comprising, a dead reckoning device having a pair of outputs representing the orthogonal coordinates of aircraft present position, means on said aircraft for measuring the elevation of the terrain at selected locations, means for making a data map having orthogonal coordinates secured from said dead reckoning device and having a surface quality representative of terrain elevation secured from said elevation measuring means, a standard map of terrain including said selected locations, means for comparing said data map with said standard map to secure a pair of error signals representative of the errors in said dead reckoning device outputs, and means for inserting said error signals as correction signals in said outputs.

9. A navigation system comprising, a dead reckoning device for providing orthogonal coordinates of present position, means for measuring the elevation of terrain below said system, means for making a data map having orthogonal coordinates secured from said dead reckoning device and having a quality of surface representative of terrain elevation in accordance with the output of said elevation measuring means, a standard map covering a path to be flown, means for cross correlating said data map with said standard map to secure signals representing orthogonal present position errors, and means for applying said signals as corrections to said dead reckoning device outputs.

10. An airborne navigation system comprising, a dead reckoning device for providing two shaft angular displacements representing orthogonal coordinates of present position, means for measuring the elevation of terrain vertically below said system, a support having a covering for making a data map, said support being two dimensionally positioned by and in proportion to said two shaft angular displacements, said covering having a quality imposed therein by said elevation measuring means, a standard map including a path to be flown, a quality of the surface thereof representing terrain elevation as a third coordinate, means for cross correlating the averages of the three coordinates of said data map and standard map, means for securing the orthogonal coordinate displacements of said maps at a selected point on a flight path, and means for applying such displacements as corrections to the two outputs of said dead reckoning device.

11. A navigational system borne by an aircraft comprising, an automatic dead reckoning device for providing two shaft angular displacements representing orthogonal coordinates of present position, a relative altimeter for securing indication of altitude above the terrain, an absolute altimeter for securing indication of altitude above datum level, subtracting means for securing the difference between the outputs of said relative altimeter and said absolute altimeter, said difference representing terrain elevation vertically beneath said aircraft, means for intermittently securing a three-coordinate data map of the ground track as flown, said data map having planar coordinates representing present position and having a surface quality representing terrain elevation, a standard map of a portion of said ground track prepared before flight having planar coordinates representing position and having said surface quality representing coordinated terrain elevation, manually operated means for cross correlating said data map and said standard map whereby intermittent determinations may be secured of positional errors at selected ground track points, manual means for correcting said two shaft angular displacements in accordance with said positional error determinations, and means for indicating said corrected shaft angular displacements.

References Cited in the file of this patent

UNITED STATES PATENTS

| | | |
|---|---|---|
| 2,526,682 | Mulberger | Oct. 24, 1950 |
| 2,586,743 | Thresher et al. | Feb. 19, 1952 |
| 2,616,077 | Holser | Oct. 28, 1952 |
| 2,648,838 | Raymond | Aug. 11, 1953 |